Jan. 25, 1966  J. H. ANDRESEN, JR  3,230,775
ALTIMETER
Filed June 25, 1962
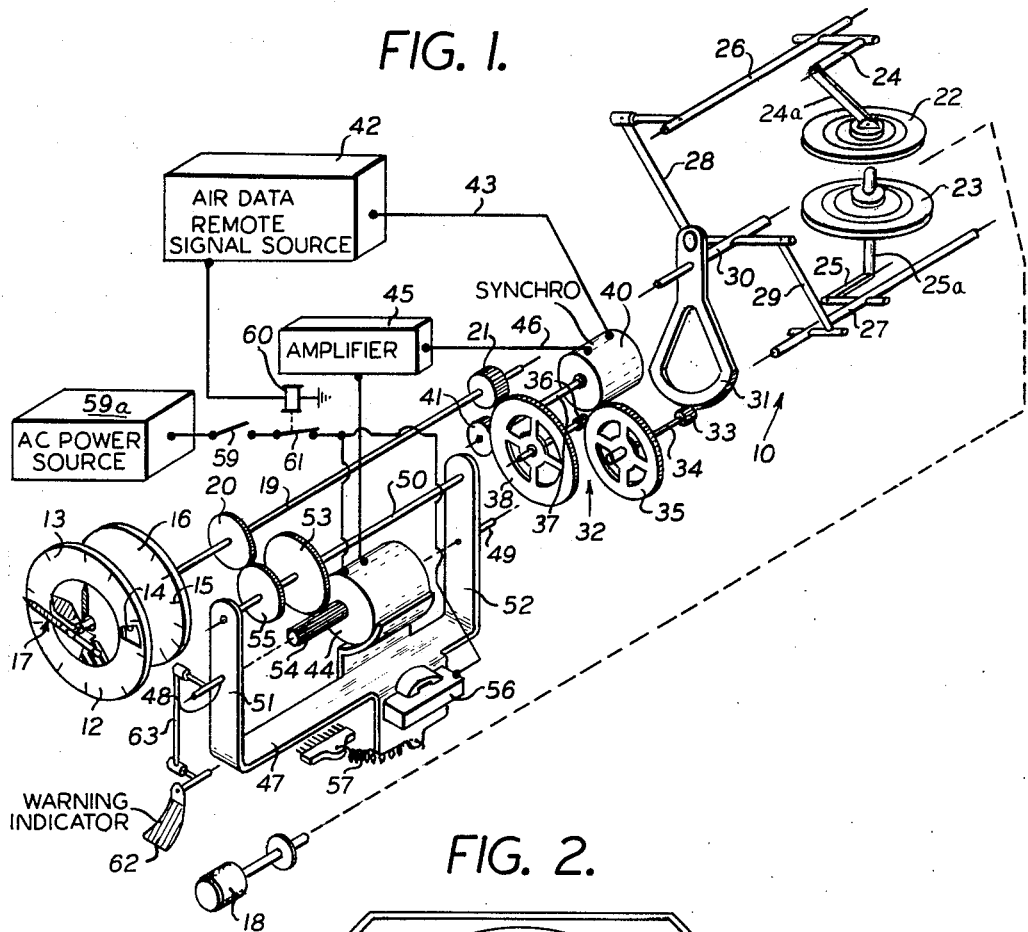
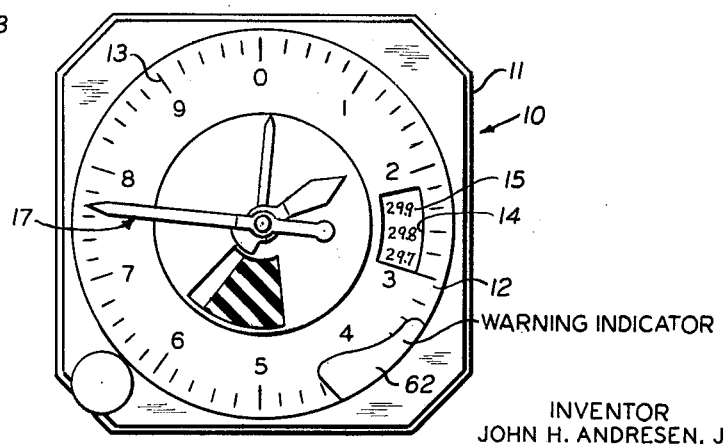
INVENTOR
JOHN H. ANDRESEN, JR.
BY
ATTORNEYS.

3,230,775
ALTIMETER
John H. Andresen, Jr., Hewitt, N.J., assignor to Astek Instrument Corp., Armonk, N.Y., a corporation of New York
Filed June 25, 1962, Ser. No. 204,773
7 Claims. (Cl. 73—387)

This invention relates in general to altimeters, and more specifically to an altimeter which is rendered directly responsive to pressure activation due to changes in altitude, or alternately, responsive to an altitude signal received from a remote signal source.

An object of this invention is to provide an altimeter which is particularly adapted for use in jet transport and other aircraft operating under air traffic control conditions where precise pressure altitude is required.

Another object is to provide an altimeter capable of accepting altitude information from a remote signal source and presenting it in lieu of that received directly from a pressure responsive diaphragm mechanism.

Still another object is to provide an altimeter in which a pilot is able to manually select the kind of altitude information adapted to be accepted by the altimeter of this invention.

Still another object is to provide an altimeter capable of responding to a remote signal source and which, in the event of power failure, will automatically revert to straight pressure activation.

Still a further object is to provide the altimeter of this invention with a warning indicator to notify a pilot that the altimeter is operating directly by the pressure responsive means.

In accordance with this invention, the above objects, features and other advantages are attained by an altimeter constructed and arranged to operate as an accurate, static pressure actuated, sensitive, altimeter driven by the expansion of an evacuated capsule. Also the altimeter of this invention is constructed so that it has the capability of accepting altitude information in synchro output form from some entirely separate and distinct source and presenting it in lieu of that from the pressure responsive mechanism. Accordingly, such separate altitude information may come from an air data computer, a radar altimeter, a sonic altimeter, or a special altitude transmitter package containing a servoed altitude transducer with electromechanical scale error and static error corrections. Means are provided to enable a pilot to select the respective mode of operation. However, the construction is such that in the event of electrical failure of the system rendering the altimeter responsive to the remote signal input, the operation of the altimeter will automatically revert to straight pressure activations. A positively actuated warning indicator is incorporated in the altimeter to apprise the pilot when the altimeter is rendered responsive to pressure actuation.

Therefore a feature of this invention resides in the provision of a dual activating altimeter constructed and arranged for enabling the altitude information in the synchro output from the remote signal source to override the response of the altimeter to pressure activation when the former is rendered operative.

Another feature resides in the provision of means for automatically reverting the altimeter to pressure activation upon any inoperativeness in the remote signal source.

Still another feature resides in positive actuation of a warning indicator for indicating the failure or inoperativeness of the remote altitude signal source.

Other features and advantages will become more readily apparent when considered in view of the drawings and description in which:

FIG. 1 is a perspective exploded view of the altimeter of this invention including a block diagram of the remote control signal source.

FIG. 2 is a front view of the altimeter.

Referring to the drawings, there is shown the altimeter construction 10 of the instant invention. It comprises a housing 11 having enclosed therein a dial 12 having marked thereon a suitable scale 13 of altitude designations. In the illustrated embodiment the altitude designations are scaled to read in tens, hundreds and thousands of feet. Obviously, other scales 13 may be used in lieu thereof. As shown, the dial 12 is provided with a cutout or window 14 through which the markings of barometric settings 15 on a sub-dial 16 may be viewed. Co-operating with the face dial 12 is an indicating means in the form of the conventional three pointer display 17 for indicating given altitudes. However, it will be understood that a dual drum and pointer type display (not shown) with a digital barometric setting counter may be substituted in lieu thereof without departing from the spirit or scope of the invention. Also the barometric counter may be in terms of inches of mercury or millibars; or two counters may be included to provide simultaneous readings of both.

Means for manual setting of the barometric setting on sub-dial 16 includes a control knob 18 which is suitably geared to the sub-dial 16 in the conventional well known manner.

In the illustrated embodiment the pointer display 17 is operatively connected to a pointer display shaft 19. Journaled on the shaft 19 in spaced relationship is a clutching gear 20 and a pinion 21. Pressure actuation of the pointer shaft 19 and connected display 17 is affected by a pair of evacuated diaphragm capsules 22, 23 which are connected in driving relationship to the pointer display shaft 19. Connected to each capsule 22, 23 is a temperature compensator 24 and 25 and links 24a and 25a, the latter conecting with the outer rocking shafts 26, 27 respectively. By suitable linkage connections 28 and 29 the respective outer rocking shafts 26, 27 are connected to a center rocking shaft 30. Journaled to the center rocking shaft 30 is a gear sector 31.

The gear sector 31 in turn is mechanically connected to the pointer display shaft 19 through the means of a gear train 32. Thus gear train 32 connects the gear sector 31 in driving relationship to the pinion 21 so that the movement of the gear sector 31 in response to the expansion of the capsules 22, 23 is transmitted directly to the pointer shaft 19.

In the illustrated embodiment the gear train 32 comprises a pinion 33 meshing with the gear sector 31. The pinion 33 is coupled by a shaft 34 to a driven gear 35. The latter in turn meshes with pinion 36 which is coupled by a second shaft 37 to a driving gear 38 which meshes with the shaft pinion 21. Thus this portion of the altimeter comprises a mechanically operated instrument deriving its power to position the pointer display 17 from the expansion of the evacuated diaphragm capsules 22, 23.

In addition the altimeter 10 in accordance with this invention has geared to its pointer display shaft 19 a synchro 40 at an integral ratio, such as 5 to 1 or 10 to 1, depending upon the rotation rate of the synchro in the remote altitude source. The illustrated synchro 40 is electrically analogous to a synchro control transformer, but has no brushes, and has a rotor assembly weighing less than one (1) gram. As shown, its rotor is geared by pinion 41 to the driving gear 38.

The synchro 40 is electrically connected to a remote altitude signal source 42, e.g. an air data computer or radar altimeter by line 43. Co-operatively associated with the synchro 40 is a servo motor 44 with an amplifier 45 being interposed in a circuit 46 between the synchro 40 and the motor 44 for amplifying the signal from the former.

In accordance with this invention the motor 44 is carried in a yoke 47 which is pivotally mounted on pivots 48, 49 for movement of shaft 50 toward and away from the pointer display shaft 19. Journaled on the yoke is shaft 50 connected between the arms 51 and 52 of the yoke 47 and is driven by gear 53 which is disposed in meshing relationship with the pinioned spindle 54 of the motor 44. Coupled on the yoke shaft 50 with the driven gear 53 is a second gear 55 which is adapted to be moved in and out of meshing relationship with the clutching gear 20 on the pointer display shaft 19.

In accordance with this invention the yoke 47 is moved toward the pointer shaft 19 to effect meshings of gears 20 and 55 when its activating solenoid 56 is energized to overcome the force of a spring means 57 which normally biases the yoke 47 toward inoperative position.

In accordance with this invention the motor 44 and solenoid 56 are connected in a common circuit 58 to a source of A.C. power supply 59a. Interposed in the circuit 58 is a manual normal open switch 59 for rendering the mode of operation of the altimeter 10 selective. When the switch 59 is closed, the solenoid 56 becomes energized causing the yoke 47 to pivot toward the pointer shaft 19 to effect meshing of gears 20 and 55 and energizing of the motor 44. When this occurs and the remote altitude signal source 46 is operating properly, it will be noted that the remote altitude signal input to the synchro 40 will cause the motor 44 through its associated gear train 53, 55 to override any pressure response of the diaphragm capsules to the pointer shaft 19.

As shown in FIG. 1, the motor 44 and the synchro 40 form a synchro type servo repeater which follows the fine synchro transmitter of the remote source of altitude information 42, e.g. an air data computer or radar altimeter. With the altimeter of the illustrated embodiment it is not necessary to transmit the coarse information so long as pressure indication and servoed information differ by less than one half turn of synchro 40 since the diaphragm mechanism keeps the synchro rotor always within a half turn of the correct altitude.

With the opening of switch 59, the solenoid 56 becomes deenergized and the yoke 47 under the bias of the spring 57 moves away from the pointer, and thus effects disengagement of the gears 20 and 55. Also the motor 44 is deenergized. When this occurs the pointer shaft 19 is rendered directly responsive to pressure activation by the diaphragm mechanisms 22, 23.

Included in the circuit between the remote altitude signal source 42 and the motor 44 and solenoid 57 is a relay 60 for maintaining a pair of contacts 61, disposed in series with switch 59, normally closed. Thus in the event of any power failure in the remote control signal source 42, the relay 60 will deenergize, thus opening the contacts 61. If and when this occurs the pointer shaft 19 is automatically reverted to pressure responsive activations by the capsules 22, 23 since the opening of contacts 61 will deenergize the solenoid 57, causing the yoke to move away from clutching gear 20.

A warning indicator in the nature of a warning flag 62 is operatively connected with the yoke 47 for appraising a pilot as to the mode of the altimeter activation. As shown in FIG. 1 a warning flag 62 is connected to the yoke 47 through a suitable mechanical linkage connection 63 constructed and arranged to pivot the flag 62 into visible position on the face of the altimeter whenever the solenoid 57 is deenergized. When this occurs, the visibility of the flag 62 will indicate that the altimeter 10 is operating by diaphragm power only. Because of the mechanical linkage 63 it becomes impossible for the warning flag 62 to operate incorrectly since the flag is mechanically linked to the motor engaging yoke. Thus the arrangement makes it impossible for the warning flag to give a false indication when the gears 20, 55 are disengaged without physically breaking off the flag or the connecting linkage. Depending on the user's preference, the flag 62 can indicate one or more of the following conditions: power failure, failure of servo to null, open lead in synchro, hardover signal in servo, and manual control set for standby operation.

From the foregoing description it will be apparent that the swinging of the motor 44 by means of the yoke 47 into and out of engagement with the pointer shaft 19 renders the motor 44 inoperative for straight pressure activation of the altimeter. This, it will be noted, constitutes an important advantage in that when he alimeter is operaing on straight pressure activation only, the capsule power need not be utilized to position the motor rotor along with that of the pointer display 17.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. An altimeter comprising a dial having a scale of altitude designation thereon and an indicating means co-operating therewith, a pressure responsive drive means mechanically connected to said indicating means to effect driving of the same, said pressure responsive drive means including an evacuated capsule, linkage means connected to said capsule, a gear sector connected to said linkage means, a gear train connecting said gear sector in driving relationship with said indicating means whereby the latter is driven in response to the expansion and contraction of said capsule according to changes in altitude, a synchro connected in meshing relationship with said gear train, a remote source of altitude information for supplying an altitude signal to said synchro, means responsive to the remote signal input to said synchro for effecting overriding of said pressure responsive drive means, said overriding means including a yoke pivotally mounted for movement between operative and inoperative positions, a motor having a drive means carried by said yoke, gear means carried on said yoke and movable with said motor connected in meshing relationship with the motor drive means, a driven gear connected to said indicating means, and means for moving said yoke to effect meshing of said gear means to said driven gear for effecting overriding of said gear train when said synchro is receiving a remote altitude signal, said yoke moving means including a solenoid, and a spring means for biasing said yoke toward inoperative position.

2. An altimeter comprising a dial having a scale of altitude designation thereon and a pointer co-operating therewith, a pointer shaft operatively connected to said point, a pressure responsive drive means mechanically connected to said pointer shaft to effect driving said pointer accordingly, said pressure responsive drive means including an evacuated capsule, rocking linkage means connected to said capsule including a rocking shaft, a gear sector connected to said rocking shaft, a gear train connecting said pointer shaft in driving relationship with said gear sector whereby said pointer is driven in response to the expansion and contraction of said capsule according to changes in altitude, a synchro means connected in meshing relationship with said gear train, a remote source of altitude information connected to said synchro means, means responsive to the signal input to said synchro for effecting overriding of said pressure responsive drive means, said means for effecting said overriding including a yoke pivotally mounted for movement toward and away from said pointer shaft, a motor having a drive pinion carried by said yoke, a drive gear carried on said yoke connected in driving relationship with the motor pinion, a reduction gear coupled to said drive gear, a driven gear journaled to said pointer shaft, and means for moving said yoke toward said pointer shaft to effect meshing of said reduction gear to said driven gear coupled to said pointer shaft for effecting overriding of said gear train when said synchro is receiving a remote altitude signal, said yoke moving means including solenoid which is energized for actuating said yoke toward operative position, and a spring means for biasing said yoke toward inoperative position.

3. An altimeter comprising a dial having a scale of altitude designation thereon and a pointer co-operating therewith, a pointer shaft operatively connected to said pointer shaft to effect the driving of said pointer accordingly, said pressure responsive drive means including a pair of evacuated capsules, a temperature compensator and associated outer rocking linkage connected to each of said capsules, a center rocking shaft operatively connected to the outer rocking linkage of the respective capsules, a gear sector connected to said center rocking shaft, a gear train connecting said pointer shaft in driving relationship with said gear sector whereby said pointer is driven in response to the expansion and contraction of said capsules according to changes in altitude, a synchro connected in meshing relationship with said gear train, a remote source of altitude information connected to said synchro, means responsive to the remote source signal input to said synchro for effecting overriding of said pressure responsive drive means, said means for effecting said overriding including a yoke pivotally mounted for movement toward and away from said pointer shaft, a servo motor having a driving pinion carried by said yoke, a drive gear carried on said yoke connected in driving relationship with the motor pinion, a reduction gear coupled to said drive gear, a driven gear journaled to said pointer shaft in position to mesh with said reduction gear, and means for moving said yoke toward said pointer shaft to effect meshing of said reduction gear to said driven gear coupled to said pointer shaft for effecting overriding of said gear train when said synchro is receiving a remote altitude signal, said yoke moving means including solenoid which is energized for actuating said yoke toward operative position, and a spring means for biasing said yoke toward inoperative position upon the de-energization of said solenoid.

4. An altimeter comprising a dial having a scale of altitude designation thereon and a pointer co-operating therewith, a pointer shaft operatively connected to said point, a pressure responsive drive means mechanically connected to said pointer shaft to effect the driving of said pointer accordingly, said pressure responsive drive means including a pair of evacuated capsules, a temperature compensator and associated outer rocking linkage connected to each of said capsules, center rocking shaft operatively connected to the outer rocking linkage of the respective capsules, a gear sector connected to said center rocking shaft, a gear train connecting said pointer shaft in driving relationship with said gear sector whereby said pointer is driven in response to the expansion and contraction of said capsules according to changes in altitude, a synchro connected in meshing relationship with said gear train, a remote source of altitude information connected to said synchro, means responsive to the signal input of said remote source for effecting overriding of said pressure responsive drive means, said means for effecting said overriding including a yoke pivotally mounted for movement toward and away from said pointer shaft, a servo motor connected in a circuit with said remote signal source, said motor having a driving pinion carried by said yoke, a drive gear carried on said yoke connected in driving relationship with the motor pinion, a reduction gear coupled to said drive gear, a driven gear journaled to said pointer shaft in position to mesh with said reduction gear, a manually operated switch connected in the circuit between said motor and said remote signal for rendering said remote signal source operative or inoperative, a fail safe relay connected in series with said switch, said relay being actuated in the event of power fail in said remote signal source, means for moving said yoke toward said pointer shaft to effect meshing of said reduction gear to said driven gear coupled to said pointer shaft for effecting overriding of said gear train when said synchro is receiving a remote altitude signal, said yoke moving means including solenoid which is energized for actuating said yoke toward operative position, said solenoid being disposed in series with said relay whereby actuation of said relay de-energizes said solenoid, and a spring means for normally biasing said yoke toward inoperative position upon the de-energization of said solenoid so that said altimeter automatically reverts to pressure actuation upon power failure in said remote signal means.

5. The invention as defined in claim 4 including a warning indicator rendered operative to inform the pilot when a power fail occurs in said remote signal means.

6. An altimeter comprising a dial having a scale of altitude designations thereon and a pointer cooperating therewith, evacuated diaphragm capsule means adapted to expand and contract in response to increases and decreases in altitude, non-yielding mechanical means connecting said capsule means to said pointer for applying a torque to said pointer for moving said pointer in reponse to expansion and contraction of said capsule, motor means for exerting a torque in accordance with altitude, a gear operatively connected to said pointer, another gear operatively connected to said motor means, means for moving said gears into and out of meshing relation for connecting and disconnecting, respectively, said motor means and said pointer, the torque exerted by said motor means being substantially greater than the torque exerted by said capsule, whereby when said motor means is connected to said pointer the torque exerted by said motor means overrides the torque exerted by said capsule.

7. An altimeter comprising a dial having a scale of altitude designations thereon and a pointer cooperating therewith, evacuated diaphragm capsule means adapted to expand and contract in response to increases and decreases in altitude, non-yielding mechanical means connecting said capsule means to said pointer for applying a torque to said pointer for moving said pointer in response to expansion and contraction of said capsule, a remote altitude signal source, a synchro connected in driving relationship to said pointer, a motor means operatively connected with said synchro, said synchro and motor means being responsive to a signal received from said remote altitude signal source, means for selectively moving said motor means from and to a position in driving relationship with said pointer to and from a position out of driving relationship with said pointer whereby the positioning of said motor means into driving relationship with said pointer renders said pointer responsive to the signal from said remote signal source, the torque exerted by said motor means being substantially greater than the torque exerted by said capsule, whereby when said motor means is connected to said pointer the torque exerted by said motor means overrides the torque exerted by said capsule.

References Cited by the Examiner

UNITED STATES PATENTS

| 2,689,480 | 9/1954 | Angst | 73—387 |
| 2,959,066 | 11/1960 | Bailey. | |
| 3,083,575 | 4/1963 | Frohradt | 73—358 |
| 3,160,012 | 12/1964 | Andresen | 73—384 |

LOUIS R. PRINCE, *Primary Examiner.*

ROBERT L. EVANS, RICHARD QUEISSER,
*Examiners.*